UNITED STATES PATENT OFFICE.

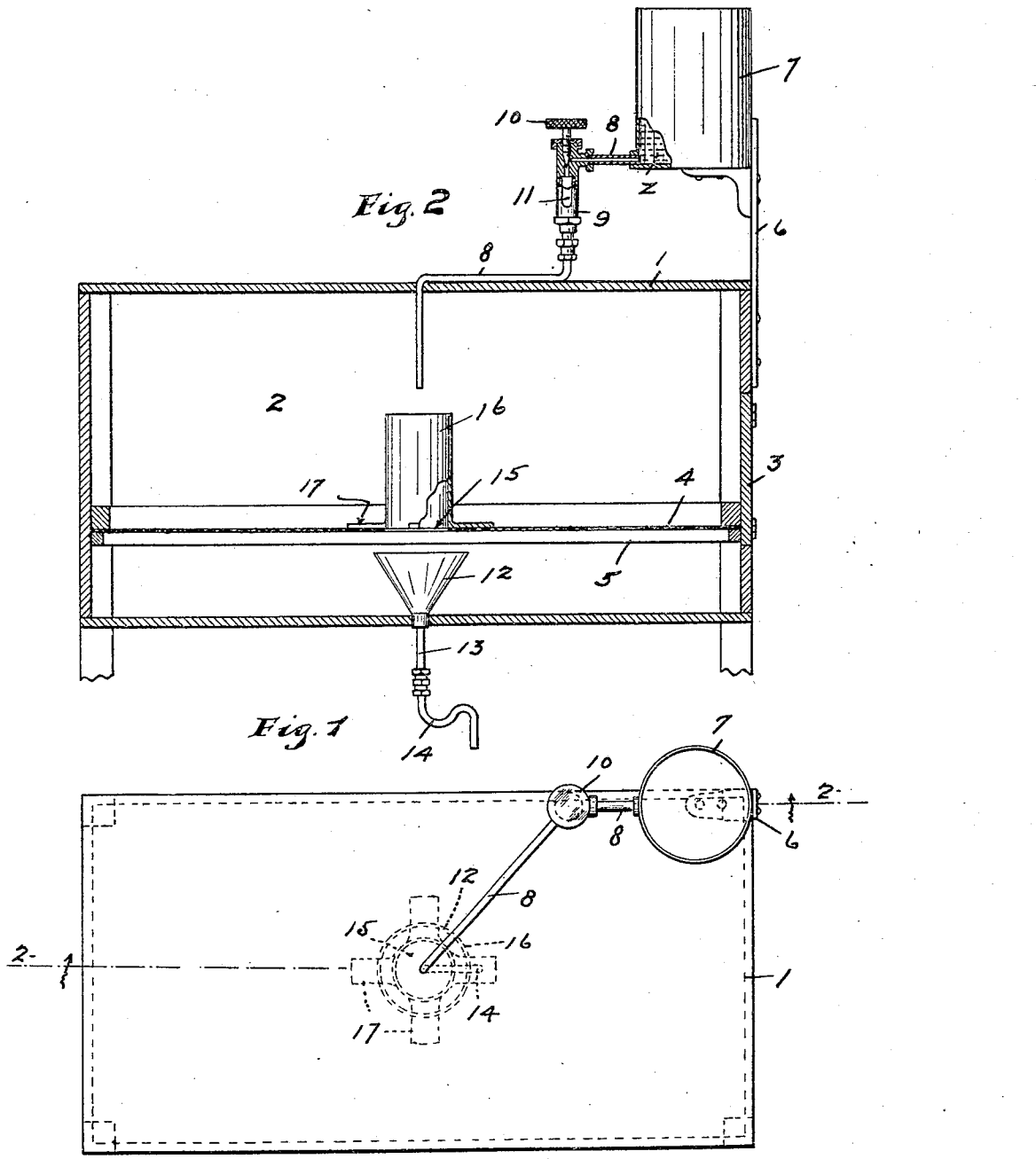

MARINUS J. NELSON, OF WEST MINNEAPOLIS, MINNESOTA.

INCUBATOR.

1,258,037.         Specification of Letters Patent.         Patented Mar. 5, 1918.

Application filed July 12, 1916. Serial No. 108,839.

*To all whom it may concern:*

Be it known that I, MARINUS J. NELSON, a citizen of the United States, residing at West Minneapolis, in the county of Hennepin and State of Minnesota, have invented certain new and useful Improvements in Incubators; and I do hereby declare the following to be a full, clear, and exact description of the invention, such as will enable others skilled in the art to which it appertains to make and use the same.

My invention relates to improvements in incubators and particularly to the moisture supply and ventilation therefor; and, to this end, generally stated, the invention consists of the novel combination of devices hereinafter described and defined in the claim.

In the accompanying drawings, which illustrate the invention, like characters indicate like parts throughout the several views.

Referring to the drawings,

Figure 1 is a plan view of an incubator having the invention incorporated therein; and Fig. 2 is a view principally in vertical section taken on the irregular line 2—2— of Fig. 1.

The numeral 1 indicates the leg-supported casing of an egg chamber 2, in one end of which casing is a door opening normally closed by a door 3. An egg tray 4 is slidably mounted on guide rails 5 secured to the inner walls of the casing 1 for movement into and out of the egg chamber 2 through the door opening. The parts thus far described may be of the standard or of any desired construction.

To the rear right hand corner of the casing 1, is secured a bracket 6 on which is supported, above the top of the incubator, a tank 7 for holding water Z. Leading from the bottom of the tank 7, is a drip pipe 8 which extends to the center of the casing 1 and is then bent vertically downward and inserted through the top thereof. Interposed in the drip pipe 8 near the tank 7, is a valve casing 9 having a needle valve 10 and a sight feed 11. That portion of the drip 8 from the valve casing 9 to the vertical delivery end portion of said pipe rests directly upon the top of the casing 1.

Axially alined with the lower vertical end of the drip pipe 8, is a funnel 12 secured in an opening formed in the bottom of the casing 1 and leading downward therefrom is a water discharge pipe 13, having formed therein a water trap 14. The water dripping from the pipe 8 collects in this trap 14 and forms a water seal to prevent air from passing to or from the egg chamber 2 through the discharge pipe 13. An annular opening 15 is cut in the bottom of the tray 4, through which the water from the pipe 8 drips. To prevent the water, dripping from the pipe 8, from getting onto the eggs, there is provided a relatively large collar or tube 16, which surrounds the opening 15 and terminates just below the delivery end of the drip pipe 8. This collar 16 is provided with a plurality of laterally projecting legs 17, which rest upon the bottom of the tray 4 and are riveted, soldered or otherwise rigidly secured thereto.

The water Z, passing from the tank 7 through the drip pipe 8, is regulated by the needle valve 10, so as to drip drop by drop through the egg chamber 2. This dripping water is prevented from splashing on the eggs by the collar 16 and the funnel 12 prevents the water from getting on the bottom of the casing 1. In starting the incubator, the needle valve 10 is open to allow sufficient water to flow from the tank 7 to fill the trap 14. As the water collects in the trap 14, the same overflows and may be caught in a suitable receptacle placed under the delivery pipe 13.

The dripping water through the egg chamber 2 supplies the necessary moisture to prevent the egg shells from getting hard and thus preventing the chickens from breaking the same, during the hatching period. This dripping water will also collect the foul air in the egg chamber and carry it therefrom. The above described invention does not in any way interfere with the heating of the incubator. When the egg tray 4 is removed from the egg chamber 2, for the purpose of filling the same or turning the egg, said tray may be placed on top of the casing 1 and the arrangement of the tank 7, valve casing 9 and drip pipe 8 is such as to not interfere with the same. The drip pipe 8 and funnel 12 are so located, with respect to the tray 4 and collar 16, as to not interfere with the free movement of the egg tray to and from the egg chamber 2.

The above described invention has, in actual usage, proven highly efficient for the purpose had in view.

What I claim is:—

The combination with the egg chamber of an incubator, and an egg tray removably mounted therein and having an aperture in its bottom, of a drip pipe leading from a suitable source of water supply with its discharge end extending into the egg chamber above said aperture, a water discharge pipe located under said aperture in position to receive the water from the drip pipe, and a collar secured to the egg tray and surrounding said aperture to prevent the water in its passage from the drip pipe to the discharge pipe from getting on the eggs on the egg tray.

In testimony whereof I affix my signature in presence of two witnesses.

MARINUS J. NELSON.

Witnesses:
W. H. NELSON,
T. J. TOPKO.

Copies of this patent may be obtained for five cents each, by addressing the "Commissioner of Patents, Washington, D. C."